(12) United States Patent
Jain et al.

(10) Patent No.: US 10,721,707 B2
(45) Date of Patent: Jul. 21, 2020

(54) CHARACTERIZATION OF A GEOGRAPHICAL LOCATION IN A WIRELESS NETWORK

(71) Applicant: GUAVUS, INC., San Jose, CA (US)

(72) Inventors: Nitin Jain, Saharanpur (IN); Shekhar Bansal, Gurgaon (IN)

(73) Assignee: GUAVUS, INC., San Jose, CA (US)

( * ) Notice: Subject to any disclaimer, the term of this patent is extended or adjusted under 35 U.S.C. 154(b) by 67 days.

(21) Appl. No.: 15/990,630

(22) Filed: May 26, 2018

(65) Prior Publication Data

US 2019/0364532 A1 Nov. 28, 2019

(51) Int. Cl.
*H04W 64/00* (2009.01)
*H04L 12/24* (2006.01)
*H04W 16/18* (2009.01)

(52) U.S. Cl.
CPC ......... *H04W 64/00* (2013.01); *H04L 41/0816* (2013.01); *H04L 41/147* (2013.01); *H04W 16/18* (2013.01)

(58) Field of Classification Search
CPC .. H04W 64/00; H04W 16/18; H04L 41/0816; H04L 41/147
See application file for complete search history.

(56) References Cited

U.S. PATENT DOCUMENTS

| 7,689,455 | B2 * | 3/2010 | Fligler | G06Q 30/02 705/7.38 |
| 9,426,665 | B2 * | 8/2016 | Ge | H04W 24/04 |
| 9,813,970 | B2 * | 11/2017 | Madan | H04W 36/32 |
| 2013/0137460 | A1 * | 5/2013 | Bodog | G01S 5/0205 455/456.2 |
| 2013/0281063 | A1 * | 10/2013 | Jactat | H04W 12/08 455/411 |
| 2015/0282104 | A1 * | 10/2015 | Damnjanovic | H04W 72/0413 455/522 |
| 2017/0230851 | A1 * | 8/2017 | Ko | H04W 24/08 |
| 2017/0353991 | A1 * | 12/2017 | Tapia | G06Q 10/20 |

* cited by examiner

*Primary Examiner* — Julio R Perez
(74) *Attorney, Agent, or Firm* — Kerr IP Group, LLC (57) ABSTRACT

A system and method of characterizing a geographical location for a wireless device in a wireless network is described. The system includes a first config management log, a second config management log, a correlation module, data bins, a location module, a predictive analysis module and a service layer module. The first config management log is associated with a plurality of base stations. The second config management log is associated with a network component communicatively coupled to the plurality of base stations. The correlation module correlates the first config management log and the second config management log with a geographic area. Each of the data bins is associated with a geographic area. The predictive analysis module analyzes the communication parameters associated with a particular geographic area. The service layer module identifies the communication parameters affecting at least one of a user experience and a quality of experience (QoE) in the particular geographic area.

10 Claims, 3 Drawing Sheets

CHARACTERIZATION OF A GEOGRAPHICAL LOCATION IN A WIRELESS NETWORK

FIELD

The description relates to a system and method for characterization of a geographical location in a wireless network. More specifically, the description relates to performing a predictive analysis, which characterizes the experience in a geographical location, for next-generation wireless networks.

BACKGROUND

A Network Operations Center (NOC) is associated with one or more locations that provide network monitoring, control and manages for a computer, telecommunication or satellite network. With respect to telecommunications, NOCs are responsible for monitoring power failures, communication line alarms such as a bit errors, and other performance issues that may affect the network.

Quality of Experience (QoE) is a measure of the overall level of customer satisfaction with a service. QoE focuses on a service experience associated with a service provider. The measurement of Quality of Experience (QoE) is a challenge for service providers such as wireless carriers. QoE requires satisfying the growing demand for secure, fast, and reliable connections. For example, emergency services, commercial, and residential services depend on consistent user experience while using a wireless network.

At any given time, a large number of calls are occurring concurrently impacting the Quality of Experience (QoE). A centralized Network Operations Center (NOC) must have full visibility and comprehensive understanding of events, alerts, and metrics impacting the user experience.

For example, signal strength varies from one location to another due to the distance from the tower, multipath fading, physical objects (e.g., buildings, concrete, steel), radio frequency interference, electrical interference, and environmental factors (e.g., weather conditions). Therefore, the data throughput, call performance, and stream quality are susceptible to interference levels that could degrade the QoE.

Subsequently, NOCs are faced with the problem of finding trends within their wireless network related to varying signal strengths. Additionally, the varying signal strengths may be associated with dense population areas having low-quality performance. Thus, the QoE may depend on the location of the User Equipment (UE), e.g. mobile device, and time period when the UE device is being used.

Compounding the problem of locating low-quality performance is that wireless users, typically, provide a low response rate to quality assurance surveys that would identify locations with low-quality performance. Even if the wireless users provided responses to quality assurance surveys or provided customer complaints, operators of wireless networks would have to quickly diagnose the causes of the customer complaints through a customer care department, which would be laborious and time consuming. Additionally, there are the challenges to the NOC of prioritizing the customer complaints and/or the quality assurance survey. Furthermore, there are the challenges of properly prioritizing the complaints and/or survey results.

Also, there is a need to collect data from every component of the network that generates performance metrics, events, and alerts that can be transformed into actionable data that is deterministically relevant. Consequently, the large volume of data generated and collected from a plurality of network devices represents storage and computational complexities.

SUMMARY

A system and method of characterizing a geographical location for a wireless device in a wireless network is described. The system includes a first config management log, a second config management log, a correlation module, data bins, a location module, a predictive analysis module and a service layer module. The first config management log is associated with a plurality of base stations communicating with the wireless device. The second config management log is associated with a network component communicatively coupled to the plurality of base stations. The correlation module that correlates the first config management log and the second config management log with one of a plurality of geographic areas. Each of the data bins is associated with a geographic area. The location module locates the wireless device and the corresponding geographic area for the wireless device. A data bin mapping operation is performed based on the location of the wireless device. The predictive analysis module analyzes the first plurality of communication parameters and the second plurality of communication parameters associated with a particular geographic area. The service layer module identifies the communication parameters affecting at least one of a user experience and a quality of experience (QoE) in the particular geographic area.

In one illustrative embodiment, the first config management log and the second config management log includes real-time data and historical data corresponding to the particular geographic area. In another illustrative embodiment, the first config management log includes a trace data associated with a plurality of wireless devices. In yet another illustrative embodiment, the second config management log includes a call summary log associated with the network component communicatively coupled to the plurality of base stations.

In a further illustrative embodiment, the correlation module includes a correlation processor and the location module includes a computing processor. In an even further illustrative embodiment, the service layer module is configured to detect a cause for a poor user experience.

Further still, each data bin is associated with an associated geographic data. Additionally, the geographic area is configured to be presented on a map by the service layer, and the data bin corresponding to the geographic area is accessed by interacting geographic area presented on the map. Also, each data bin may include a log of at least of one of a signal strength, an interference level, a dropped call and a PRB utilization. Further yet, the predictive analysis module is configured to predict dropped calls.

DRAWINGS

The present subject matter will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. Additionally, the methods may vary as to details, order of the actions, or other variations without departing from the illustrative methods disclosed herein.

The systems and methods described herein address user experience and Quality of Experience (QoE) challenges with a service layer and a prediction analysis module, which operate on top of operational computing modules and processors leveraging data from multiple sources using a data collection engine for next-generation wireless networks. Note, for purposes of this patent the term "module" and "processor" may be used interchangeably, however, the term "module" refers to a software component that may operate with a plurality of processors in a distributed, parallel, serial or other such manner capable of executing the software component.

User experience of a wireless user depends on the user location and time of the day. The term "user experience" is related to a user's experiences with services. User experience (UX) is related to human and computer interactions and the measurement of user experiences is performed with qualitative research. By contrast, Quality of Experience (QoE) is motivated by economic needs, is technology centered and relies on quantitative research.

A QoE parameter, such as signal strength, may be used as an indicator to determine the level of interference at different locations and at different times. As a result of varying signal strength at different times and different location, various QoE parameters such as data throughput, voice quality and video quality are affected.

The systems and methods described herein self-identify unreported problems regarding call performance, signal strength, and interference level that affect the end user experience and QoE without human intervention. Additionally, the illustrative system and method described herein prioritizes issues in the wireless network, which provides a proactive rather than a reactive approach. Furthermore, the illustrative system and method include predictive components and modules that respond quickly to the issues affecting the QoE and user experience. Further still, the illustrative system and method perform predictive analysis from multiple sources at massive scale and in real-time, which would help Network Operations Centers (NOCs) improve their mean-time-to-repair (MTTR) and Quality of Experience (QoE).

The illustrative system and methods presented herein may be applied to a plurality of next-generation mobile wireless technologies including, but not limited to, 2 G, 3 G, 4 G, 4 G LTE and XLTE, 5 G and other such standards and technologies. The illustrative systems and methods presented herein may be embodied in a a customer aware analytics system that is used, individually or combination with other systems, to meet the requirements for a specific Quality of Experience (QoE) mandate associated with a geographical location in a wireless network.

Figure 1:
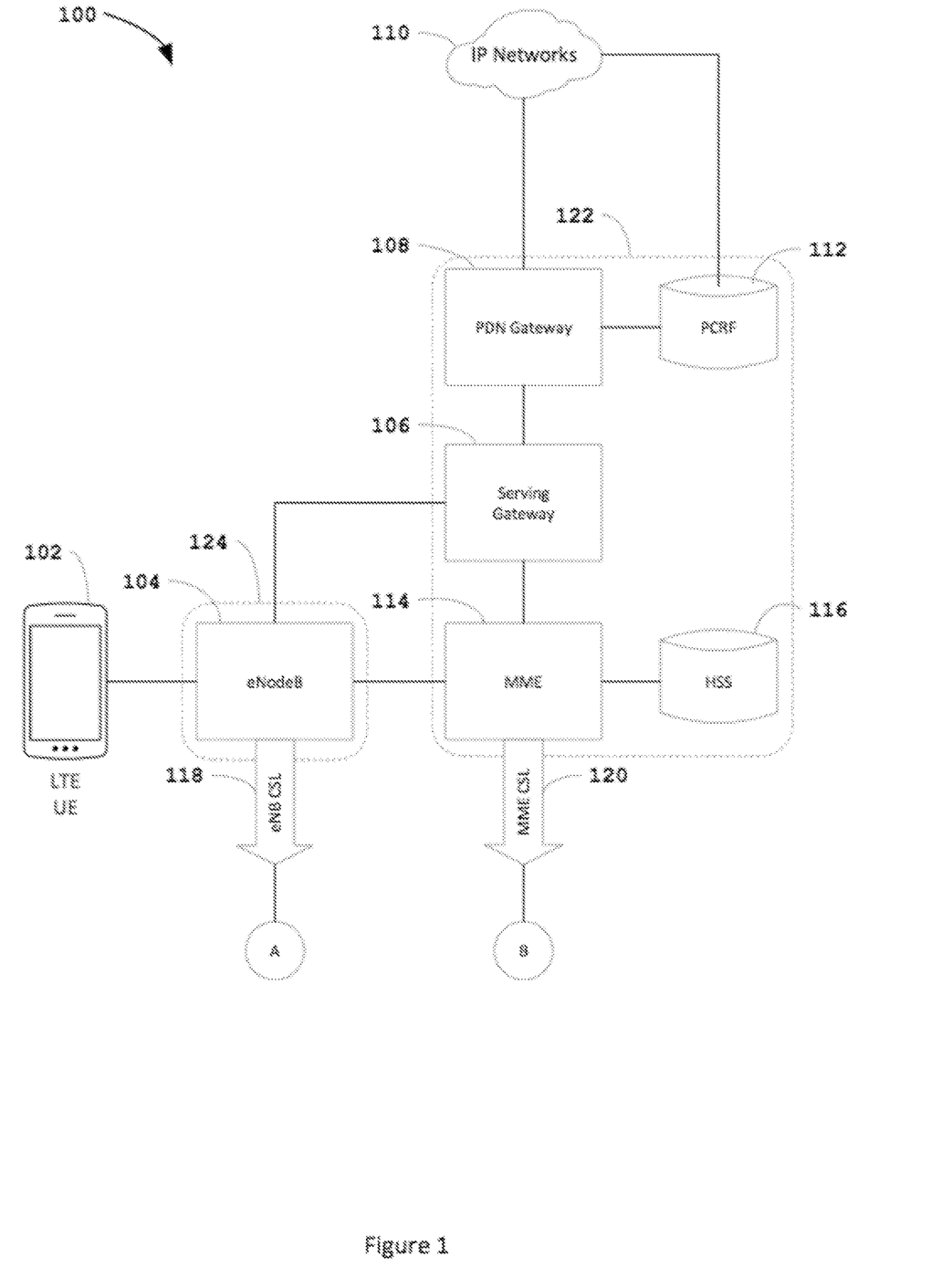
FIG. 1 shows a radio network system with a plurality of data feeds used for characterization of a geographical location in a wireless network.

Referring to FIG. 1, there is shown an illustrative wireless network, namely, an Evolved Packet System (EPS) 100, which includes packet switching technology that requires an Internet connection between a packet data network (PDN), such as IP Networks 110, and a User Equipment (UE) 102, i.e. a wireless device. The Evolved Packet System (EPS) 100 architecture includes the UE 102, an Evolved UTRAN (E-UTRAN) 124, and an Evolved Packet Core (EPC) 122 network. In the illustrative embodiment, the wireless device 102 may be moving at a driving speed and/or a walking speed.

In the illustrative embodiment, the User Equipment 102 (UE), such as a smartphone, provides connectivity to the IP Network 110 (e.g., Internet). The user equipment 102 sends and/or receives data from the IP Network 110 (e.g., Internet) establishing a communication channel with the Packet Data Network (PDN) Gateway 108. The channel setup involves message exchanges between the UE 102 and the Mobility Management Entity (MME) 114.

In coordination with the eNodeB base station 104, the Serving Gateway 106, and the Packet Data Network (PDN) Gateway 108, data plane tunnels are established between the eNodeB base station 104 and the Serving Gateway 106, and between the Serving Gateway 106 and the Packet Data Network (PDN) Gateway 108. Also, the network establishes a virtual communication channel, called an EPS bearer, to connect the UE 102 and the base station 104. The E-UTRAN 124 and the EPC 122 are responsible for IP packet switching with a defined Quality of Service (QoS) through the EPS bearers.

For network access and service, entities in the illustrative network 100 exchange control plane messages. A specific sequence of such control plane message exchange is called a "network procedure." For example, a booting mobile device 102 initiates an attach procedure with the MME 114, which includes establishing a radio connection to the base station 104. Thus, each network procedure involves the exchange of several control plane messages between two or more entities. The specifications for these are defined by the various 3GPP Technical Specification Group.

The E-UTRAN 124 includes of a plurality of base stations, which are also referred to as an eNodeB base station 104. By way of example and not of limitation, the Enhanced Packet Core (EPC) 122 may include a Mobility Management Entity (MME) 114, a Serving Gateway (S-GW) 106, a PDN Gateway (P-GW) 108, a Home Subscriber Server (HSS) 116, and a Policy Control and Charging Rules Function (PCRF) 112.

The eNodeB base station 104 performs UE resource allocation for uplink and downlink, manages connection states (e.g., IDLE, connected) and provides mobility control. Additionally, the eNodeB base station 104 provides data buffering, transmission control, and congestion control.

The Mobility Management Entity (MME) 114 handles UE mobility while in IDLE mode with tracking area updates. Additionally, the MME 114 maintains UE context in IDLE mode, NAS signaling, NAS signaling security, and bearer management.

Serving Gateway (S-GW) 106 is capable of functioning as a mobility hook for data bearers and buffer downlink data. A PDN Gateway (P-GW) 108 is responsible for allocation of IP address to UE, tagging download IP packets with a QoS, and packet filtering. The Policy and Charging Rules Function (PCRF) 112 operates as a software node designated in real-time to enforce policy rules and authorizations in accordance with a user subscription plan. The Home Subscriber Server (HSS) 116 maintains a Quality of Service (QoS) profile, access control, roaming restrictions, MME identity, MME registration, including an authentication center (AUC) for authentication and key management.

The Call Summary Log (CSL) generated from an illustrative eNodeB (eNB) base station 104 and Mobility Management Entity 114 support a plurality of data feeds such as eNB CSL 118 and MME CSL 120. For instance, Voice over IP calls would contain a better QoS value than web browsing. The data mining techniques applied to collect the data feeds are based on data at rest and real-time data.

The Call Summary Log (CSL) is a feature that collects detailed information regarding a call such as the call release type, call duration, and handover information. The illustrative CSL data may be collected by an eNB. When a call is setup, the eNB starts to collect information for the call. When the call is released, the eNB reports CSL data to the data collection engine. In the illustrative embodiment, the Call Summary Log (CSL) is an MME 114 and eNodeB 104 feature that is generated to record information about every call released and rejected by the system. A CSL data feed includes a plurality of data streams and storage including but not limited to file outputs that may be accessible through SFTP or HTTPS services.

The CSL data includes detailed information related to a call. By way of example and not of limitation, the CSL data may include information items such as: call information, common item information, connection information, release information, handover information, throughput information, RF information, adjacency information, UE history information and call debugging information.

The illustrative wireless network 100 supports a system and method of characterizing a geographical location for a wireless device in a wireless network is described. The system and method includes a first config management log such as eNodeB (eNB) Call Summary Log (CSL) 118, which is associated with base stations communicating with a UE 102. Additionally, the system and method includes a second config management log such as Mobile Management Entity (MME) Call Summary Log (CSL) 120, in which the MME 114 is the illustrative network component that communicatively coupled to the eNB base stations 104.

Figure 2:
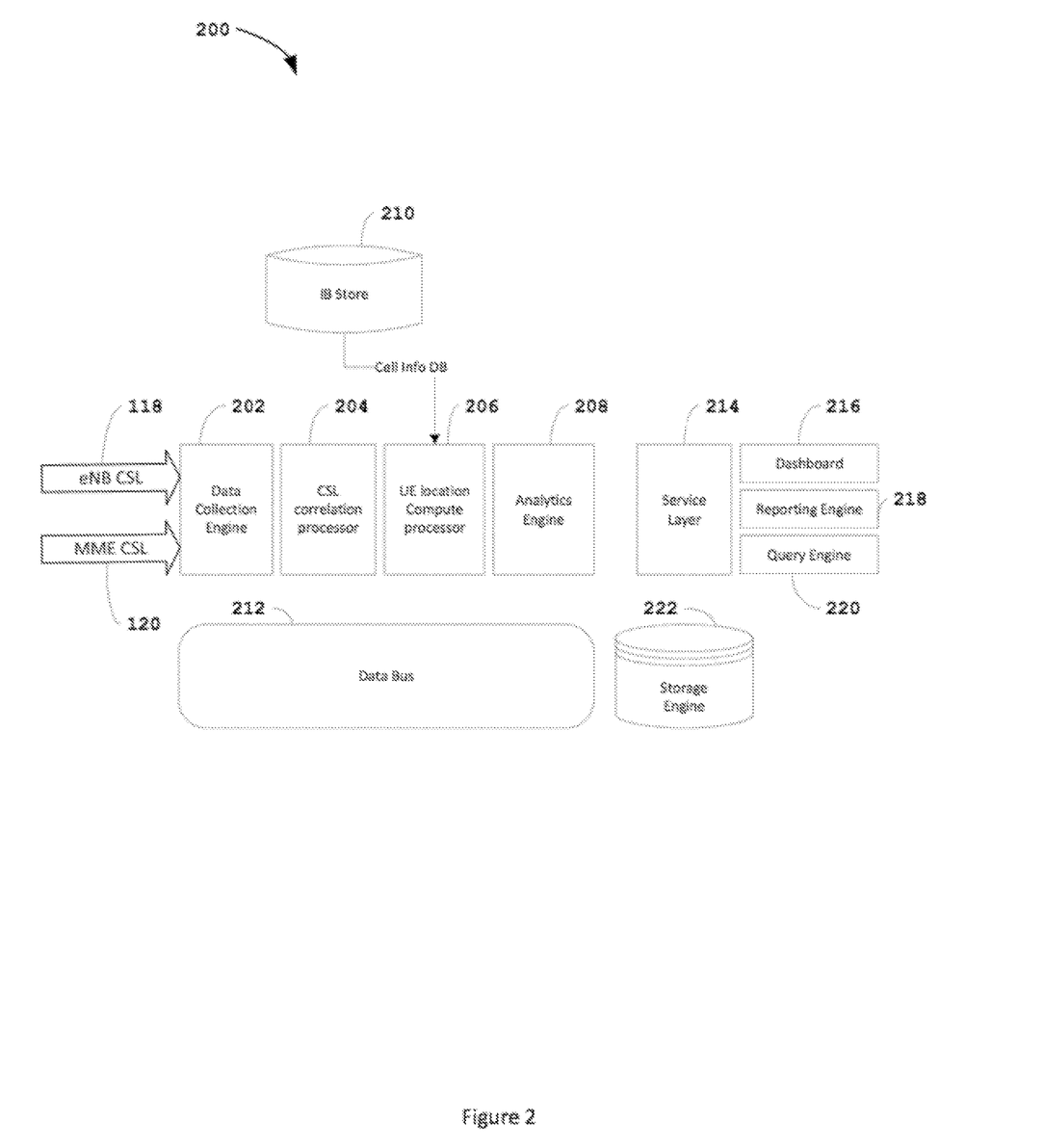
FIG. 2 shows a flowchart for the method and system for characterization of a geographical location in a wireless network.

Referring now to FIG. 2, there is shown a system 200 for characterization of geographical location in the wireless network 100 shown above. A plurality of data sources or logs are configured be received by an illustrative data collection engine 202. By way of example and not of limitation, a first data source log, e.g. eNB CSL 120, is communicated to the data collection engine 202.

More specifically, the eNodeB (eNB) base station 104 refers to the Evolved Node B that is the evolution of the element Node B. Node B provides the communication between mobile phones (UEs) and the wider telephone network. In contrast to GSM base stations, Node B uses WCDMA/TD-SCDMA as the air interface technology. The eNB base station uses the E-UTRA protocols OFDMA and SC-FDMA as the air interface technology.

The second data source log 120 is configured to be communicated to the data collection engine 202. By way of example and not of limitation, the second data source is Mobile Management Entity (MME) trace data. The MME is a component of an illustrative Evolved Packet Core (EPC) wireless network. The MME is the key control node for an illustrative LTE network. The MME is responsible for idle mode UE paging and tagging procedure including retransmissions. The MME is involved in the bearer activation/deactivation process and is also responsible for choosing the Serving Gateway (SGW) for a UE at the initial attach and at time of intra-LTE handover involving Core Network (CN) node relocation. The MME is responsible for the authenticating the user by interacting with the Home Subscriber Server (HSS); the HSS is a master database that includes subscriber profiles, subscriber location and IP information. The MME checks the authorization of the UE to use the service provider's Public Land Mobile Network (PLMN) and enforces UE roaming restrictions. The MME is the termination point for ciphering and integrity protection and handles security key management. The MME also provides the control plane function to mobility between LTE and 2 G/3 G access networks. The MME provides a variety of other key control node functions, which are well known to the those of ordinary skill in the art having the benefit of this description. The functional components and operations of the MME may also reside in a GPRS network, even though the illustrative embodiment is directed to an LTE-access network.

The config management logs 118 and 120 may include CSL, trace data or any combination thereof. In one illustrative embodiment, the first config management log and the second config management log include real-time data and historical data corresponding to the particular geographic area.

In general, the CSL data includes detailed information related to a call. By way of example and not of limitation, the CSL data may include information items such as: call information, common item information, connection information, release information, handover information, throughput information, RF information, adjacency information, UE history information and call debugging information.

Trace data includes subscriber and equipment trace, which give instantaneous values for a specific event, e.g. call, location update, etc. Subscriber and equipment "trace" provide detailed information at a call level on one or more specific mobile devices. The trace data provides an additional source of information when compared to Performance Measurements. Performance Measurements provide a permanent source of information. Trace may be activated on user demand for a limited period of time for specific analytic purposes. Trace plays a major role in activities such as determination of the root cause of a malfunctioning mobile, advanced troubleshooting, optimization or resource usage and quality, RF coverage control and capacity improvement, dropped call analysis, Core Network and UTRAN end-to-end UMTS procedure validation.

Trace records have to contain information elements or signaling message from control signaling and/or the characteristics of the user data. Various network elements and traceable interfaces are described in the 3GPP TS 32.421 Technical Specification—Release 10.

The trace reference, trace type and operation system identification are all provided on trace activation. Each record may contain an MSC Server, MGW, SGSN, GGSN, S-CSCF, P-CSCF, UTRAN, HSS, MME, Serving GW, or E-UTRAN event record. The following are illustrative components of trace record description and include an Information Element (IE) name, an interface name, a protocol name, a message name and trace depth. The trace data may be stored as an XML file. Additionally, the trace data may be associated with a single call or multiple calls. Also, the trace data may be associated with a trace sessions or multiple trace recorded sessions.

Cell traffic trace refers to the ability to trace one or more active calls in one or more cells. For a cell traffic trace, the identification of the cells where trace data is to be collected is required. Additionally, the type of network elements to be traced are required. The identification of the subscriber that is being traced is also required. Furthermore, the cells that are being traced must be identified for the cell traffic trace.

Furthermore, the config management logs received by the data collection engine 202 may include cell information from a database that includes a geo-location and the related radio properties for the geo-location. Further still, the data sources for the data collection engine 202 may include a measurement report data feed that includes data sets associated with other relevant wireless network parameters. The data collection engine may also perform data acquisition and data cleanup.

The data collection engine 202 is communicatively coupled to a correlation module 204. The correlation module 204 correlates the first config management log 118 and the second config management log 120 based on network elements and session details. By way of example and not of limitation, network elements include eNB identifiers, MME identifiers and S1AP identifiers. More generally, the correlation module 204 correlates the data from the various data sources. In one embodiment, the data correlation may include identifying commonalities between the various data sources.

By way of example and not of limitation, the illustrative correlation module 204 is a Call Summary Log (CSL) processor 204. For example, the CSL processor 204 may use the time domain to correlate the eNB CSL data with the MME CSL and/or trace data, when the data sets are different. Thus, in the illustrative embodiment, a combination of time-based correlation and location-based correlation are used by the correlation processor 204 to generate historical and real-time data sets that may be stored in storage engine 222.

Data bins that receive the correlated output from the correlation module 204 may be disposed at the storage engine 222. In the illustrative embodiment, each of the data bins is associated with a geographic area. The illustrative storage engine 222 collects metrics and event data in real-time and at a relatively large scale from the data sources as described herein; and data transfers are performed using a data bus 212 representing the physical layer.

The data bin stores the correlated first config management log and the second config management log corresponding to the geographic area. For purposes of this patent, the term "bin" refers to a geographic area and data gathered therefrom that is associated with a space partitioning data structure that enables queries and supports, by way of example and not of limitation, nearest neighbor search algorithms. By way of example and not of limitation, the data set corresponding to the bin may include signal strength at a plurality of locations, tracking signal strength at a variety of locations within the predetermined bin are, call volume, call performance, and call volume of VIP customers or unique wireless priority service status (e.g., first responders). Additionally, trends in signal strength, call volume, call performance, interference level, dropped calls, unique wireless priority service status, and Physical Resource Block (PRB) utilization may also be associated with a specific bin. A PRB includes a group of resource elements containing subcarrier channels, and a time slot following a modulation scheme (e.g., QPSK, 16QAM, 64 AM); PBRs may be transmitted by an LTE station.

In another illustrative embodiment, the data bin is associated with a geographical area the includes QoE data, which is further associated with delivering the user experience to one or more users within the geographic area. By way of example and not of limitation, the QoE data associated with the bin may include signal strength, interference level, call performance (e.g., number of dropped calls), PRB utilization and other such parameters or indicators.

By way of example and not of limitation, an illustrative predetermined geographic area, e.g. 50-meter by 50-meter (50 m×50 m) area, is associated with a data bin. The data corresponding to the illustrative 50 m×50 m area may be associated with one or more bins, however, in the illustrative embodiment a 50 m×50 m are is associated with a single data bin. A "grid" is then used to aggregate a plurality of bins.

Thus, each data bin is associated with an associated geographic data. Also, each data bin may include a log of at least of one of a signal strength, an interference level, a dropped call and a PRB utilization.

The system 200 for characterization of geographical location in the wireless network 100 also includes a location module 206, which locates the wireless device and the corresponding geographic area for the wireless device. The location module 206 may be embodied as location compute processor 206, which is communicatively coupled to the IB store 210. In one embodiment, a User Equipment (UE) location compute processor 206 is communicatively coupled to the IB Store 210. In another embodiment, the UE location compute processor 206 is also communicatively coupled to the CSL correlation processor 204.

In the illustrative embodiment, the UE, i.e. wireless device, location is calculated by a UE location compute processor 206 using IB store 210 informational database. The UE location may be calculated with GPS coordinates, using assisted GPS (AGPS) and other such location systems. For example, location and distance may be determined using handset-based location positioning systems, network-based location positioning systems and the combination thereof. The location may be further determined by measuring parameters such as received signal strength, timing advance, time of flight, angle of arrival, proximity, fingerprinting, or any combination thereof.

After computing the location of the wireless device, a data bin mapping operation is performed based on the location of the wireless device. Thus, bin mapping is performed after determination of the user location. The bin mapping operation may be performed by a bin mapping module (not shown), a predictive analysis module 208 or any combination thereof.

The predictive analysis module 208 analyzes the first plurality of communication parameters and the second plurality of communication parameters associated with a particular geographic area. The predictive analysis module may be embodied as an analytics engine 208 that is communicatively coupled to the UE location compute processor 206 and the CSL correlation process 204. The analytics engine 208 receives the output from both processors and performs data modeling operations using the predictive analysis method with the UE in the wireless network. The analytics engine 208 operates on live data feeds as opposed to using test sets.

The predictive analysis module 208 characterizes a geographical location in a wireless network and utilizes machine learning. In addition, classification models generate categorical data for call logs, wireless priority service status, anomalies, and location services. In one embodiment, machine learning ingests large-scale data and real-time data for learning. The illustrative machine learning provides a prediction function. At any given time, a large number of calls are occurring concurrently. Therefore, a large-scale real-time ingest of data feeds are processed in parallel with the high volume of logs. The predictive analysis module corrects and incorporates fidelity into the predictive analysis process in a dynamic, automated, and interactive manner. In the illustrative embodiment, the predictive module applies mathematical models that leverage machine learning algorithms to solve problems that regression analysis cannot solve. Thus, the predictive analysis module is configured to predict dropped calls.

In the illustrative embodiment, data at rest includes digital information outlining trend, activity, and conditions of user experience data and QoE data in a wireless network. Additionally, data at rest is used for supervised machine learning. Furthermore, the data output and data feeds belong to a continuous and categorical spectrum of values; the data feeds include but are not limited to eNodeB call history log report, eNB Call Summary Logs (CSL) 118, Mobility Management Entity (MME) CSL 120 and trace data, cell information, a database containing geolocation and radio properties 210, and measurement report data.

A service layer module 214 identifies the communication parameters affecting the user experience and a quality of experience (QoE) in the particular geographic area. Thus, the service layer module is configured to detect a cause for a poor user experience. The Service Layer 214 is communicatively coupled to one or more of the data collection engine 202, the cell info database in the IB store 210, the storage engine 222 and the analytics engine 208. The Service Layer 214 provides a backend, which support a frontend platform that includes a dashboard 216, a reporting engine 218, and a query engine 220. The reporting engine 218 and query engine 220 may include an Application Programming Interface (API) for system integration. The dashboard 216, reporting engine 218 and query engine 220 may be embodied as an interactive graphical user interface that presents data selected by an operator. The illustrative operator can manipulate the system to achieve complete visibility of the user experience features by location bins.

Figure 3:
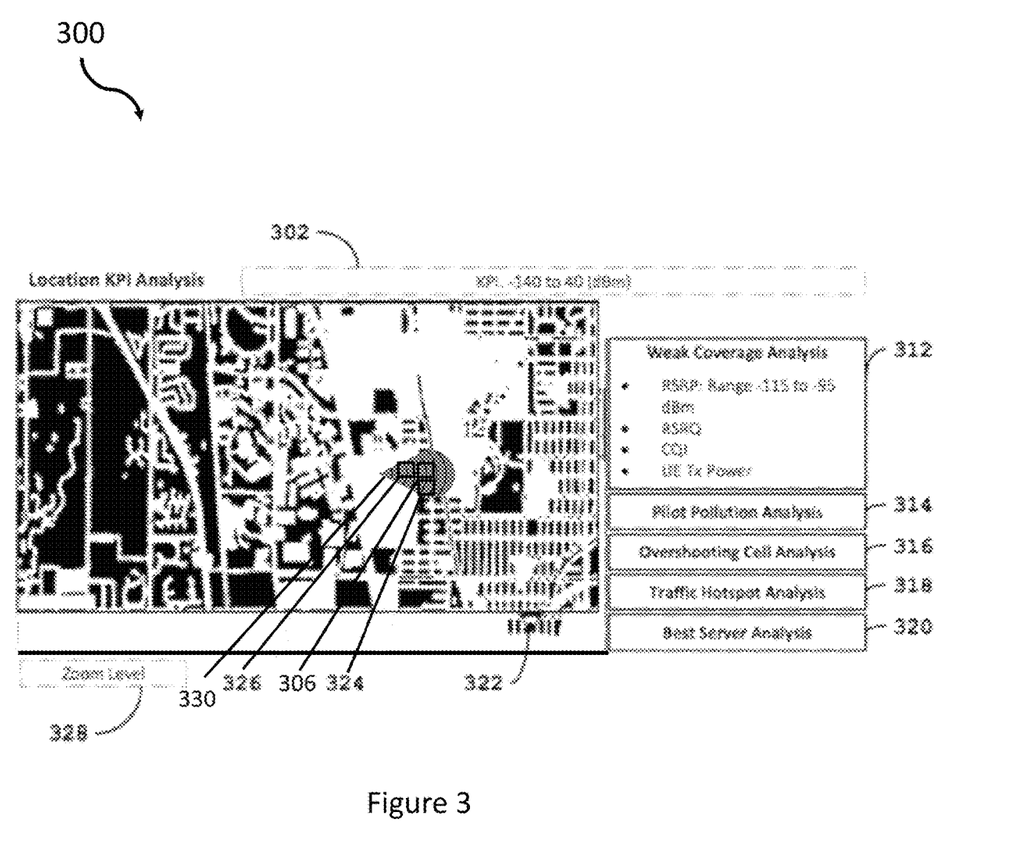
FIG. 3 shows the presentation layer for the method and system for characterization of a geographical location in a wireless network.

Referring to FIG. 3, there is shown an illustrative interactive user interface 300 for the system and method presented herein. The illustrative user interface 300 may also be referred to as a presentation layer for the characterization of a geographical location in a wireless network.

The illustrative presentation layer 300 includes a graphical user interface having a Location Key Performance Indicator (KPI) analysis 302, a map 304 and a plurality of trending or selected data bins 306, 326, and 324. The illustrative geographic area, e.g. 50 m×50 m, is presented on a map corresponding to the presentation layer, which is further associated with the service layer 214. The user selectable or trending data bins 306, 326 and 324 may be accessed by interactring with the geographic areas presented on the map. A predictive analysis of bins 306, 326, and 324 show trends for bad signal strength, highest call volume, and worst call performance including VIP customers (e.g., first responders) or unique customers.

Additionally, the illustrative user interface 300 also includes a plurality of wireless coverage symbols 308, 310, and 322, which represents a radio cell tower and direction of coverage. The presentation layer 300 may also provide a weak coverage analysis 312, which provides metrics such as Reference Signal Received Power (RSRP), Reference Signal Received Quality (RSRQ), Channel Quality Indicator (CQI) and UE transmit power. Furthermore, the presentation layer may include a pilot pollution analysis 314, an overshooting cell analysis 316, a traffic hotspot analysis 318, and a best server analysis 320. The weak coverage analysis 312

For example, map bin trending information may include a grid of 50 m×50 m areas that are overlaid on a global map, in which each has a bin of data associated with it. In the illustrative analytics user interface, the user can select any bin of data and visualize statistical MODE of the RSRP (10 dB window) trend. By way of example and not of limitation, the trend may be for a previous hour, a previous 24-hour period, two or more days, a previous week, a previous month or any other user selectable time frame.

Another illustrative analytic enables a user to select any illustrative 50 m×50 m bin and visualize MODE of the RSRQ (5 dB window) trend. By way of example and not of limitation, the trend may be for a previous hour, a previous 24-hour period, two or more days, a previous week, a previous month or any other user selectable time frame.

Subscriber and equipment trace give instantaneous values for a specific event, e.g. call, location update, etc. Subscriber and equipment "trace" provide detailed information at a call level on one or more specific mobile devices. The trace data provides an additional source of information when compared to Performance Measurements. Performance Measurements provide a permanent source of information. Trace may be activated on user demand for a limited period of time for specific analytic purposes. Trace plays a major role in activities such as determination of the root cause of a malfunctioning mobile, advanced troubleshooting, optimization or resource usage and quality, RF coverage control and capacity improvement, dropped call analysis, Core Network and UTRAN end-to-end UMTS procedure validation.

Trace records have to contain information elements or signaling message from control signaling and/or the characteristics of the user data. Various network elements and traceable interfaces are described in the 3GPP TS 32.421 Technical Specification—Release 10.

The trace reference, trace type and operation system identification are all provided on trace activation. Each record may contain an MSC Server, MGW, SGSN, GGSN, S-CSCF, P-CSCF, UTRAN, HSS, MME, Serving GW, or E-UTRAN event record. The following are illustrative components of trace record description and include an Information Element (IE) name, an interface name, a protocol name, a message name and trace depth. The trace data may be stored as an XML file. Additionally, the trace data may be associated with a single call or multiple calls. Also, the trace data may be associated with a trace sessions or multiple trace recorded sessions.

Cell traffic trace refers to the ability to trace one or more active calls in one or more cells. For a cell traffic trace, the identification of the cells where trace data is to be collected is required. Additionally, the type of network elements to be traced are required. The identification of the subscriber that is being traced is also required. Furthermore, the cells that are being traced must be identified for the cell traffic trace.

The systems and methods described herein enable an end user to visualize trend analysis of signal strength, interference level, number of dropped calls for any specific bin on map.

With respect to analytics, the systems and methods utilize real data and the data are not generated from test drives. The systems and methods presented herein enable the user identify a trend for bins with bad signal strength over a period of time. Additionally, the analytics supported herein include identifying a trend of bin or bins with a highest call volume. Furthermore, the analytics support identifying yet another trend of bin(s) having worst call performance. Further still, a combination of worst call performance and highest call volume may be supported by the analytics. Further yet, the highest call volume may be associated with a particular type of customer, in which the customer may be a unique customer or a VVIP customer, wherein VVIP refers to a voice and video Internet Protocol customer Additionally, the predictive component or module may be used to plot aggregated trace data into the 50 m×50 m bins associated with the world map. By way of example and not of limitation, the trace data may include eNodeB trace data, UE trace data and MME trace data from an illustrative LTE network.

The presentation layer 300 includes a trend analysis of signal strength, interference level, number of dropped calls for any specific bin on the map. Further analysis shows the trend of bins with limited signal strength over a period, the trend of bins with highest call volume, and the trend of bins with worst call performance including VIP customers (e.g., first responders) or unique customers.

By way of example and not of limitation, the network operator can select alerts that are presented in real-time in order to prevent problems that could impact the user experience. Also, users can select any bin and visualize statistical MODE of the Reference Signal Received Quality (RSRQ) (e.g., 5 dB window) trend over the last day, week or month.

The illustrative system and method includes a predictive component or module that performs a predictive analysis of QoE paraments such as signal strength, interference level and dropped calls. The illustrative system and method can predict a user experience based on predictively modelling or analyzing Call Service Logs (CSL), which is a QoE parameter. The result of predictive component or module is that the cause of the poor user experience can be determined based on measure QoE parameters. Thus, with respect to network capacity planning, a proactive real-time action can be taken to manage and control network capacity. The predictive component or module is configured to generate an analytics' display that allows the user to visualize statistical data, geographic data, plot aggregated data, trend analysis and other such visualization tools and data sets.

The dynamic system and method presented herein provide machine learning capabilities to find causes and effects of network problems, provide actionable data in the form of metrics, alerts or events through the presentation layer 300, maintain a proactive position in the network, and facilitate planning and hardware deployments.

The service layer module provides situational awareness and operational intelligence about the trends of bins that have an impact on the user experience of a geographical location in a wireless network.

The illustrative system and methods presented herein are configured to improve response time, reduces costs, maintains high levels of customer satisfaction, and client loyalty. The illustrative system and method includes a predictive analysis component and/or module that analyzes signal strength, call volume, interference level, unique wireless priority service status, and call performance including but not limited to dropped calls in the future. In the illustrative system and method presented herein, the characterization of a geographical location in the wireless networks involves predictive analysis using machine learning techniques. Additionally, the predictive analysis may be performed to profile and trace the signal strength, the interference level, and the call performance, including but not limited to, dropped calls in the future, which reduces the time to identify problems and improves the mean-time-to-repair (MTTR) by the Network Operations Centers (NOCs).

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method of characterizing a geographical location for a wireless device in a wireless network, comprising:
   collecting a first config management log associated a plurality of base stations communicating with the wireless device, wherein the first config management log includes a first plurality of communication parameters and a first config management log geographic location;
   collecting a second config management log from a network component communicatively coupled to the plurality of base stations, wherein the second config management log includes a second plurality of communication parameters and a second config management log geographic location;
   correlating, with a correlation module, the first config management log and the second config management log with one of a plurality of geographic areas, wherein each geographic area includes a plurality of geographic locations, and wherein the plurality of geographic locations include the first config management log geographic location and the second config management log geographic location;
   repeatedly storing, in one of a plurality of data bins, wherein each data bin is associated with a geographic area, the correlated first config management log based upon the first config management log geographic location and the second config management log based upon the second config management log geographic location;
   locating, with a location module, the wireless device at one of the plurality of geographic locations and a corresponding geographic area for the wireless device;
   performing a data bin mapping operation based on the location of the wireless device;
   analyzing, with a predictive analysis module, the first plurality of communication parameters and the second plurality of communication parameters associated with a particular geographic area; and
   identifying, with a service layer module, the communication parameters affecting at least one of a user experience and a quality of experience (QoE) in the particular geographic area.

2. The method of claim 1 wherein the first config management log and the second config management log further comprise a plurality of real-time data and a plurality of historical data corresponding to the particular geographic area.

3. The method of claim 1 wherein the first config management log includes a trace data associated with a plurality of wireless devices.

4. The method of claim 1 wherein the second config management log includes a call summary log associated with the network component communicatively coupled to the plurality of base stations.

5. The method of claim 1 wherein the correlation module includes a correlation processor and the location module includes a computing processor.

6. The method of claim 1 wherein the service layer module is configured to detect a cause for a poor user experience.

7. The method of claim 1 wherein each data bin is associated with an associated geographic data.

8. The method of claim 7 wherein the geographic area is configured to be presented on a map by the service layer, and the data bin corresponding to the geographic area is accessed by interacting geographic area presented on the map.

9. The method of claim 7 wherein each data bin includes a log of at least one of a signal strength, an interference level, a dropped call and a Physical Resource Block (PRB) utilization.

10. The method of claim 7 wherein the predictive analysis module is configured to predict dropped calls.

* * * * *